P. GIRAUD.
Preserving Butter.
No. 33,482. Patented Oct. 15, 1861.
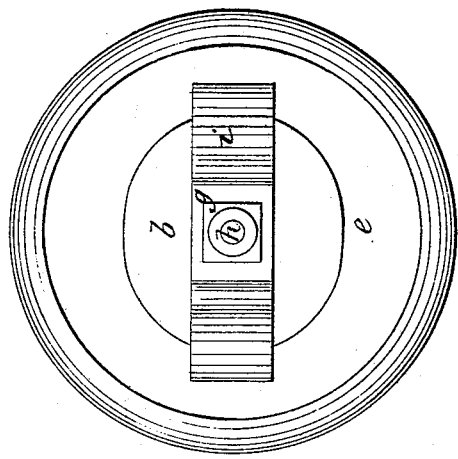
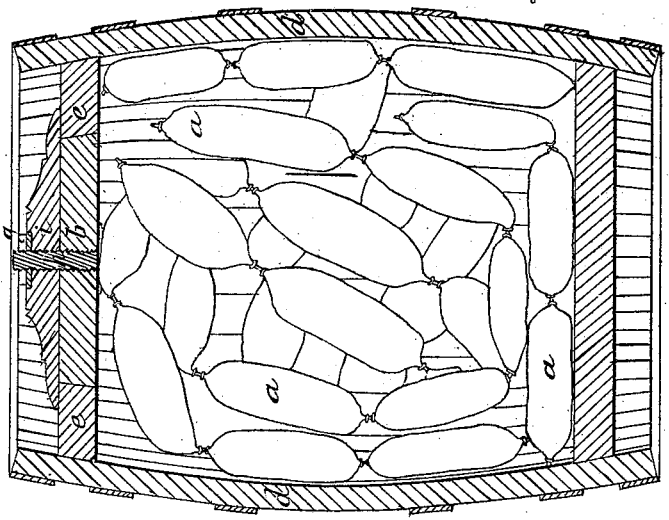
Witnesses
George C. Lambright
J. J. Everett
Inventor
P. Giraud

UNITED STATES PATENT OFFICE.

P. GIRAUD, OF NEW YORK, N. Y.

IMPROVEMENT IN MODE OF PRESERVING BUTTER.

Specification forming part of Letters Patent No. 33,482, dated October 15, 1861.

*To all whom it may concern:*

Be it known that I, P. GIRAUD, of the city of New York, in the State of New York, have invented a new and useful Improvement in Preserving Butter; and I do hereby declare the following to be a full, clear, and exact description thereof, reference being had to the accompanying drawings, and to the letters and marks thereon.

The object of my invention is to preserve and keep in pure and good condition butter for any length of time and to have it kept so that such quantity as may be required for immediate use only need be disturbed or exposed, the other portion not being subjected to any exposure.

The drawings forming part of this specification illustrate the manner of putting in practice my invention, Figure 1 thereof being a view by vertical section of a keg containing butter in sacks, Fig. 2 being a top view of the keg, and Fig. 3 a view of the sacks containing the butter.

In each of the figures where like parts are shown like letters are used to indicate the parts.

I take fresh and good butter and by any of the means commonly used for filling sacks made of the intestines of animals force the butter within the sacks $a$, so regulating the quantity of the butter forced in that I may tie in two places $b$ and $c$ the sacks at various points, and thus have such quantity shut off as may be desirable. By thus tying the sacks at various points the part between the two ties can be cut, and thus each part still remain tight and impervious to air or liquid. The sacks may therefore by these ties be divided into sections of greater or less quantity, as may be preferred or as may the better adapt them to the wants of a large or small family.

Any animal-intestines may be used for the sacks. I prefer those of beeves or horned cattle.

The intestines should be thoroughly cleaned. I have a method under which they can be rendered perfectly pure and odorless.

Having filled and tied the sacks, as described, I place them in a jar, keg, or cask and fill in such space as they do not occupy with brine of full strength, made either entirely of salt and water or with them and a small quantity of alum. Any of the brines used for preserving animal fiber will answer. Heading up the keg or cask or closing tight the jar will leave the sacks excluded from the air and the butter in them perfectly protected from every tainting or injurious cause or means. The sacks being surrounded by and floating in the liquor will not be subject to being broken by any rough handling or movement of the keg or cask.

The Fig. 1 of the drawings shows the sacks contained in a cask $d$, the opening in the head $e$ or upper end being closed in a peculiar manner. This opening in the head is of oval form and is closed by a valve or center plate $f$ of like form. It will be perceived that the edge of the plate $f$ is beveled, as also the edge of the opening, so that when the nut $g$ is turned for tightening upon the screw $h$, affixed in the plate $f$ and passing through the bar $i$, the beveled surfaces can be brought into such close contact as to make a perfectly-tight joint. It will also be seen that by taking off the nut and the bar the plate $f$ may easily be turned at right angles to the length of the opening, and thus readily be removed.

The means here shown for closing the opening in the head of the cask can be adapted to jars or cans.

What I claim as my invention, and desire to secure by Letters Patent, is—

Preserving butter by means of the sacks and brines in casks, as herein set forth.

This specification signed this 16th day of September, 1861.

P. GIRAUD.

Witnesses:
T. T. EVERETT,
ARTHUR L. MCINTIRE.